United States Patent

Muramatsu et al.

[11] Patent Number: 5,812,806
[45] Date of Patent: *Sep. 22, 1998

[54] DATA DRIVEN INFORMATION PROCESSOR CONFIGURING EACH DATA PACKET WITH A MULTI-ATTRIBUTE TAG HAVING AT LEAST TWO COMPONENTS

[75] Inventors: Tsuyoshi Muramatsu; Ryuji Miyama, both of Tenri, Japan

[73] Assignee: Sharp Kabushiki Kaisha, Osaka, Japan

[*] Notice: The term of this patent shall not extend beyond the expiration date of Pat. No. 5,30,151.

[21] Appl. No.: 784,769

[22] Filed: Jan. 16, 1997

Related U.S. Application Data

[62] Division of Ser. No. 299,098, Sep. 2, 1994, Pat. No. 5,630,151.

[30] Foreign Application Priority Data

Sep. 2, 1993 [JP] Japan .................................. 5-218774

[51] Int. Cl.⁶ .............................. G06F 15/82; G06F 15/00
[52] U.S. Cl. ...................................... 395/377; 395/800.25
[58] Field of Search .................................. 395/377, 376, 395/800.25, 26, 27; 370/392

[56] References Cited

U.S. PATENT DOCUMENTS

| | | | |
|---|---|---|---|
| 5,058,001 | 10/1991 | Li | 395/800 |
| 5,117,489 | 5/1992 | Komori et al. | 395/800.25 |
| 5,226,131 | 7/1993 | Grafe et al. | 395/377 |
| 5,404,539 | 4/1995 | Onozaki | 395/728 |
| 5,448,745 | 9/1995 | Okamoto | 395/800.25 |
| 5,596,767 | 1/1997 | Guttag et al. | 395/800.34 |

FOREIGN PATENT DOCUMENTS

| | | |
|---|---|---|
| 6421539 | 1/1989 | Japan . |
| 6426236 | 1/1989 | Japan . |

Primary Examiner—Meng-Ai T. An
Attorney, Agent, or Firm—Birch, Stewart, Kolasch & Birch, LLP

[57] ABSTRACT

A method and device for configuring data packets for a data driven processor, the data driven information processor having a data packet generator that generates the data packets, and a data flow ring architecture for operating (according to data flow computational protocol) upon data packets received from the data packet generator. The data packet generator configures each data packet to include a multi-attribute tag. The multi-attribute tag has a first component and a second component. The first component identifies one of a plurality of data sets to which data contained in the data packet belongs. The second component uniquely identifies the data within the particular data set identified by the first component contained in the data packet. Where the data driven information processor is doing image processing: the first component of the multi-attribute tag is the field/image number; and the second component of the multi-attribute tag is the location of a pixel in the field/image. The second component can be represented in two parts, the first part being the line of the image in which the pixel is located and the second part being the column in which the pixel is located.

14 Claims, 9 Drawing Sheets

| INPUT | OUTPUT |
|---|---|
| R(n-1) | INPUT FROM n-TH ADDER |
| Rn | INn |
| R(n-1)+Rn | INn |
| NONE | INPUT FROM n-TH FIELD NUMBER REGISTER |

DATA DRIVEN INFORMATION PROCESSOR CONFIGURING EACH DATA PACKET WITH A MULTI-ATTRIBUTE TAG HAVING AT LEAST TWO COMPONENTS

This application is a divisional of application Ser. No. 08/299,098, filed Sep. 2, 1994, now U.S. Pat. No. 5,630,151.

BACKGROUND OF THE INVENTION

1. Field of the Invention

The present invention generally relates to data driven information processors, and more particularly, to a technique of forming a data packet in a data driven information processor.

2. Description of the Related Art

In a conventional von Neumann computer, a plurality of instructions constituting a program are prestored in a program memory. By a program counter specifying addresses of a program memory sequentially, instructions are read out from the program memory to be executed.

On the other hand, a data driven information processor is one kind of non Neumann computers not having a concept of a successive execution of instructions by a program counter. The data driven information processor employs an architecture based on parallel processing of instructions. In the data driven information processor, as soon as data to be subjected to operation is available, instructions can be executed. Since a plurality of operations, driven by data, are carried out simultaneously, programs are carried out in parallel according to a natural flow of data. Therefore, significant reduction of a time required for operation can be expected.

The data driven information processor generally forms a data packet as shown in FIG. 1, for example. The data packet includes a data portion in which data to be subjected to processing is stored, and a tag portion in which destination information of the data is stored. The tag portion includes a generation number and a destination number. The generation number is an identifier assigned to each data group for distinguishing the data groups from each other when the data driven information processor processes a plurality sets of data groups. The destination number is an identifier assigned to each data packet for distinguishing data packets belonging to a certain generation from each other. The number of kinds of the destination number is usually the same as the number of input data of a certain generation in a program to be executed. The data driven information processor applies desired processing to each data by sending the data packet to a pipeline.

In forming a data packet, it is necessary to apply input data as well as destination information corresponding to the data. Much labor is required when such destination information is generated by manual operation.

Japanese Patent Laying-Open No. 64-26236 (data driven computer), for example, makes a suggestion for reducing workload of forming a data packet. According to the technique disclosed in this literature, as far as data are input to the data driven computer in a predetermined order, destination information is automatically added to the input data. Even if information of a destination address or the like is not applied, processing results are provided in a predetermined order. Also, in this literature, input data packets are divided into generations for every predetermined number of packets in order to distinguish a plurality sets of data groups from each other. The same generation number is applied to data packets belonging to a certain generation. As a result, data processing can be carried out without inconsistency.

Consider the case where an object to be processed by the data driven information processor is image information as shown in FIG. 2, for example. Data to be processed can be considered three-dimensional data specified by three elements, that is, field, line, and pixel. It is necessary to distinguish these three dimensions in processing the image information. On the other hand, a generation number is for distinguishing data belonging to different data groups, as described above. Operation processing between data packets of different generation numbers leads to inconsistent results. Therefore, image information must be processed on the basis of generations and dimensions.

However, generation numbers were formed in a conventional data driven information processor by simply dividing input data packets into generations in an order of input, and simply assigning an increasing natural number to generations as shown in FIG. 3. Therefore, the conventional data driven information processor sometimes required input of data in a special order to process multidimensional data. Furthermore, the conventional data driven information processor was not sometimes able to process data efficiently.

In order to detect a control signal for automatically generating destination information in the conventional data driven information processor, a detecting circuit as shown in FIG. 4, for example, was used. Let $RIN_n$ be an input signal of a cycle n, and $ROUT_n$ be an output signal, the circuit is configured so that the following logical expression holds:

$$ROUT_{n+1} = RIN_n \tag{1}$$

It should be noted that the input signal RIN corresponds to a control signal, and the output signal ROUT corresponds to a detected control signal. This circuit operates so that the value of the input signal $RIN_n$ when a clock signal CK rises attains the value of the output signal $ROUT_{n+1}$.

Consider the case shown in FIG. 5, for example. Referring to FIG. 5, the clock signal CK rises from an "L" level to an "H" level at times t1, t2, t3, t4, t5, t6 and t7, and falls from the "H" level to the "L" level at respective intermediate times. Assume that the input signal RIN is initially at the "H" level, switches to the "L" level at time t1', and again rises to the "H" level at time t2'. Assume that the input signal RIN again falls to the "L" level at time t4'.

Since the input signal RIN falls from the "H" level to the "L" level at time t1', an output signal Q of a D type flip-flop shown in FIG. 4 falls from the "H" level to the "L" level at time t2 in response to a rising of the clock signal CK. Since the input signal RIN rises from the "L" level to the "H" level at time t2', the output signal Q rises from the "L" level to the "H" level at time t3 in response to a rising of the clock signal CK.

The output signal Q is directly output as the output signal ROUT. The output signal ROUT attains the "L" level during a time period t2–t3, and attains the "H" level during a time period t3–t5. More specifically, the "L" level of the output signal ROUT during the time period t2–t3 is detected as a control signal.

Since the output signal ROUT attains the value of the input signal RIN at a rising of the clock signal CK, however, a control signal detecting circuit shown in FIG. 4 has the following problems. Assume that a detected period of the control signal must be equal to one cycle of the clock signal CK. Also assume that, when the detected control signal is at the "L" level for one cycle, the detected control signal must always return to the "H" level in the next cycle.

In order to maintain the detected control signal at the "L" level over one cycle of the clock signal CK during the time period t2–t3 and to bring the detected control signal to the "H" level in the next cycle, the input signal RIN must be always switched to the "H" level during the time period t2–t3 (for example, at t2') after the "L" level during the time period t1–t2 (for example, at t1'). Otherwise, the output signal ROUT remains at the "L" level. When the input signal RIN is brought to the "L" level at time t4' of FIG. 5, and maintained low, for example, the output signal ROUT stays at the "L" level.

As described above, the input signal RIN must be always returned to the "H" level after once attaining the "L" level, resulting in intricate generation mechanism of the input signal RIN. When the cycle of the clock signal CK is short, it is sometimes difficult to switch the input signal RIN between the "L" level and the "H" level in such a short cycle.

SUMMARY OF THE INVENTION

The present invention is for solving such problems as described above. One object of the present invention is to provide a data driven information processor which can readily form a data packet from data managed on the basis of generation information, and is suitable for processing data of a certain type managed on the basis of such generation information.

Another object of the present invention is to provide a data driven information processor which can manage generation information in destination information of a data packet multidimensionally.

Still another object of the present invention is to provide a data driven information processor which can simplify the generation process of an original control signal in detecting the control signal.

The data driven information processor according to the present invention includes a data packet forming device, a program storing device, a composite data generating device, an operation processing device, and an output device. The data packet forming device forms a data packet by adding destination information to externally applied data. The program storing device prestores a data flow program, reads out instruction information and the next destination information from a position determined based on destination information included in an applied data packet in the data flow program, replaces instruction information and a destination number in the applied data packet with the readout instruction information and destination information, and outputs the data packet. The composite data generating device, connected to the program storing device so as to receive the data packet from the program storing device, detects instruction information for which all data required for execution of the instruction is available based on destination information and instruction information included in the received data packet, and outputs a data packet including the instruction information, data required for execution of the instruction information, and destination information corresponding to the instruction information. According to the instruction information included in the data packet provided from the composite data generating device, the operation processing device operates on the data included in the data packet provided from the composite data generating device and outputs a data packet including at least the operation result and destination information. The output device, connected to the operation processing device and the data packet forming device so as to receive data packets provided therefrom, selectively outputs the received data packets to the outside of the program storing device or the data driven information processor based on destination information.

The data packet forming device, a generation number generating device, and a data combining device. In response to externally applied data, the destination number generating device generates a destination number in a predetermined manner, and generates a generation number update signal when the destination number satisfies a certain condition.

In response to the generation number update signal, the generation number generating device (1) updates a plurality of generation number components numbers in separate manners, and (2) generates a multidimensional generation number, e.g., by concatenating generation number components numbers.

A multidimensional generation number identifies two things. The first thing is the generation to which data, contained in the data packet, belongs. The second thing is an additional attribute of the data contained in the data packet. The externally applied data, the destination number provided from the destination number generating device, and the generation number provided from the generation number generating device, and outputs the combined result as a data packet.

According to the present invention, since destination numbers are automatically generated by the destination number generating device, manual operation required for input of data and formation of a data packet is reduced. In addition, the generation number is automatically formed so that it contains a plurality of numbers updated separately. Therefore, a generation number can be generated which is more suitable for processing of data such as a video signal, which is more preferably processed three-dimensionally than one-dimensionally. As a result, a data driven information processor can be provided which can readily form a data packet from data managed on the basis of generation information, and is suitable for processing data of a certain type managed on the basis of such generation information.

According to preferred embodiments of the present invention, the generation number includes a plurality of partial generation numbers. The generation number generation device includes an increment trigger generating device, and a multidimensional generation number generating device. In response to the generation number update signal, the increment trigger generating device generates a plurality of increment trigger signals in different cycles. In response to the plurality of increment trigger signals, the multidimensional generation number generating device generates a plurality of partial generation numbers increasing in different cycles and with different increments, respectively. The multidimensional generation number generating device concatenates these numbers to generate a multidimensional generation number. As a result, a data driven information processor can be provided which can manage generation information in destination information of a data packet multidimensionally.

According to another aspect of the present invention, the data packet forming device includes a control signal detecting device for detecting an externally applied control signal or an internally generated control signal, to generate a detected signal lasting for a predetermined time. The control signal detecting device includes a first detecting device, a delay device, and a logic circuit. The first detecting device outputs a first detected signal which changes to a first value upon detection of change of a control signal into a certain value. The delay device delays the first detected signal for a predetermined time. The logic circuit generates a detected signal by carrying out a predetermined logic operation between the first detected signal and the output of the delay device. When the control signal changes into the certain value, the first detected signal changes into the first value, which is delayed by the delay device for a predetermined time. By carrying out a logic operation between the first detected signal and the delayed first detected signal, a detected signal lasting for a predetermined time can be obtained. Even if the control signal is not returned to its original value after changing into the certain value, the detected signal lasts for a predetermined time, and then returns to its original value. It is not necessary to return the control signal to its original value. As a result, a data driven information processor can be provided which can simplify generation mechanism of an original signal in detecting a control signal.

The foregoing and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Figure 1:
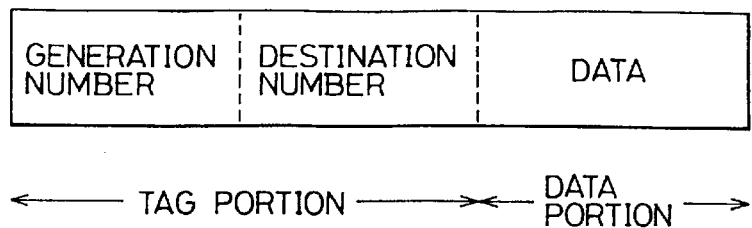
FIG. 1 schematically shows a configuration of a conventional data packet.
Figure 2:
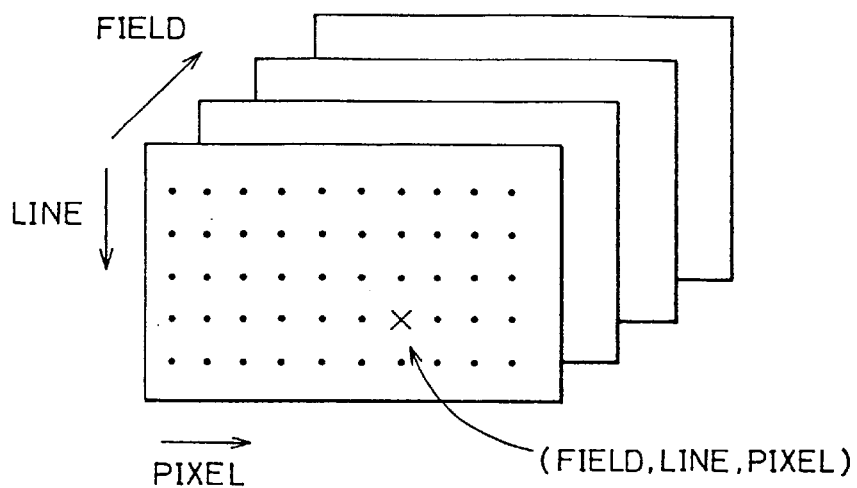
FIG. 2 schematically shows a configuration of general image processing data.
Figure 3:
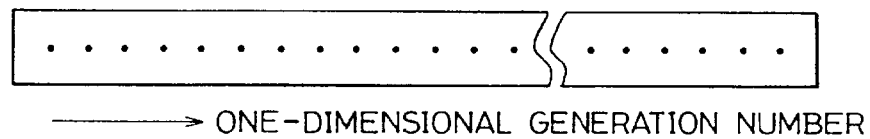
FIG. 3 schematically shows a manner of generation management of data in a conventional data driven information processor.
Figure 4:
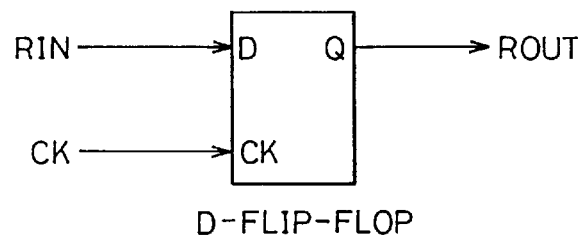
FIG. 4 is a block diagram showing a configuration of a conventional signal processing circuit.
Figure 5:
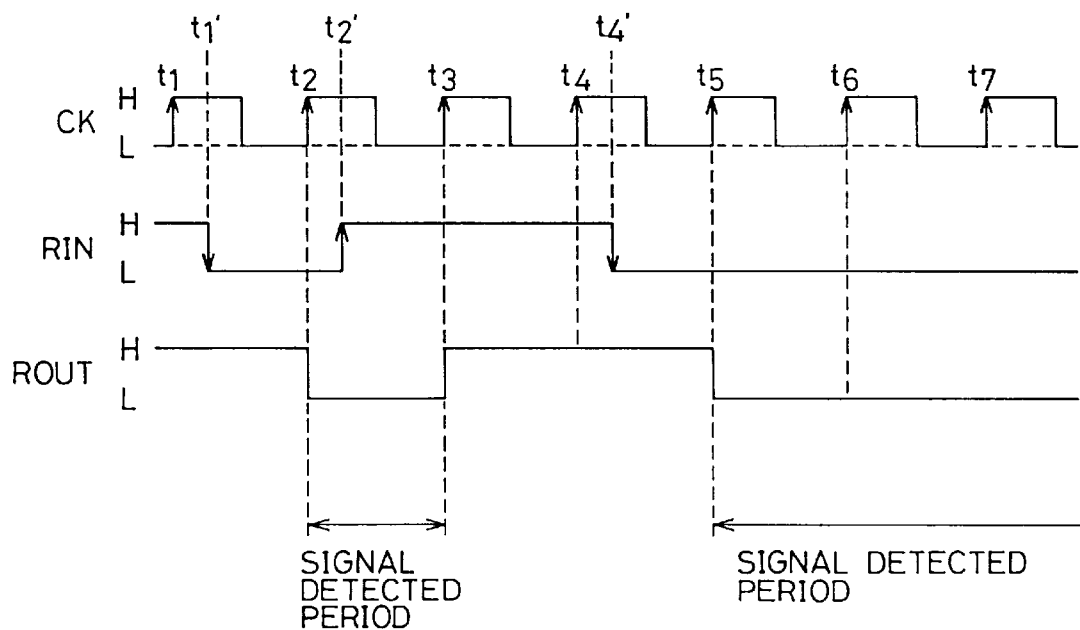
FIG. 5 is a waveform diagram showing change of respective signals in the conventional signal processing circuit.
Figure 6:
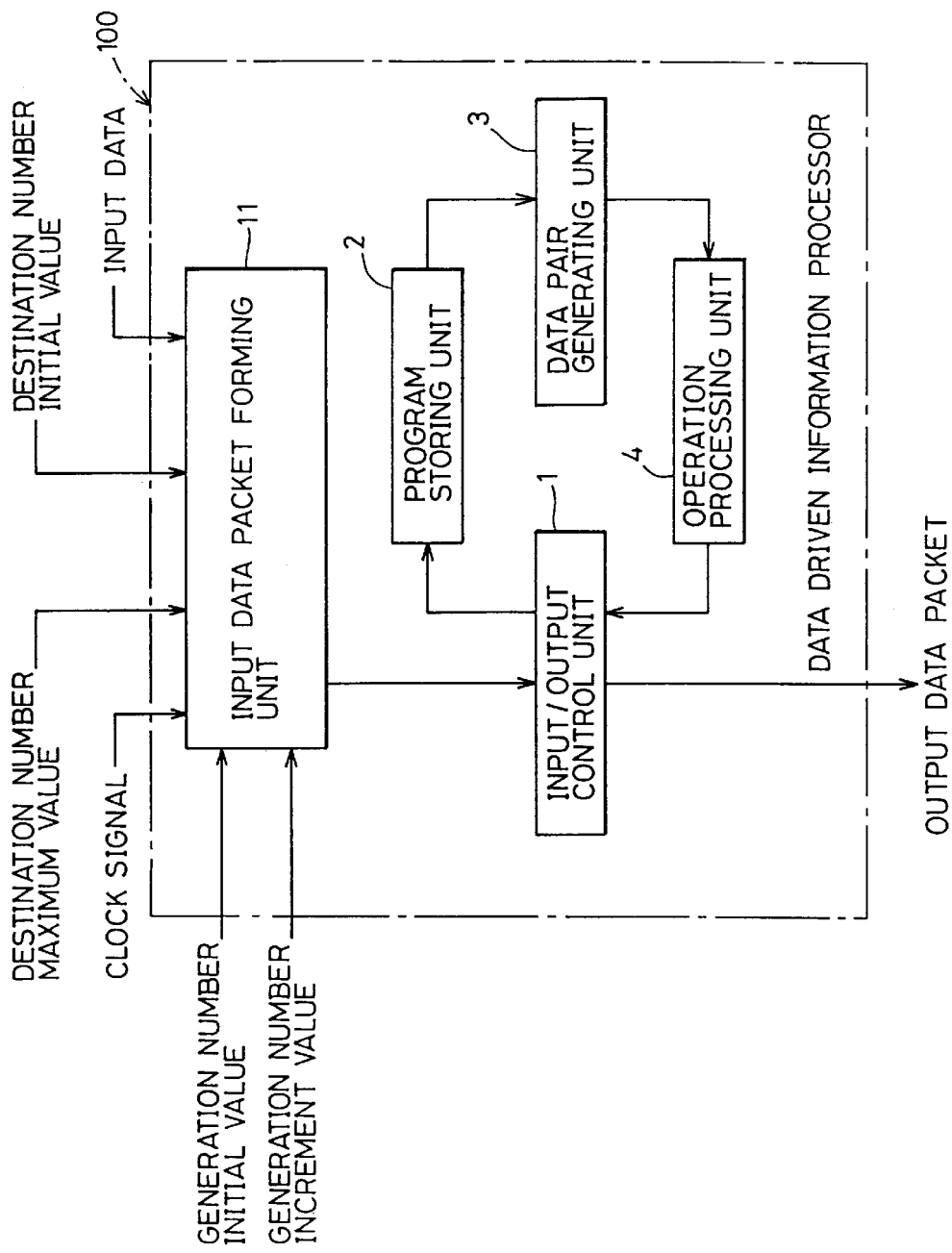
FIG. 6 is a block diagram showing a configuration of a data driven information processor according to one embodiment of the present invention.

Referring to FIG. 6, a data driven information processor 100 of one embodiment of a data driven information processor according to the present invention includes an input data packet forming unit 11, an input/output control unit 1, a program storing unit 2, a data pair generating unit 3, and an operation processing unit 4.

Input data packet forming unit 11 is one example of data packet forming means. Program storing unit 2 is one example of program storing means. Data pair generating unit 3 is one example of composite data generating means. Operation processing unit 4 is one example of operation processing means. Input/output control unit 1 is one example of output means.

Input data packet forming unit 11 receives input data, as well as a clock signal, an initial value of a destination number, the maximum value of the destination number, an initial value of a generation number, and an increment value of the generation number from the outside world.

Input/output control unit 1 has an input connected to the output of input data packet forming unit 11 and an input connected to the output of operation processing unit 4. Input/output control unit 1 also has an output for externally outputting a data packet, and an output connected to the input of program storing unit 2. The output of program storing unit 2 is connected to the input of data pair generating unit 3. The output of data pair generating unit 3 is connected to the input of operation processing unit 4.

Figure 7:
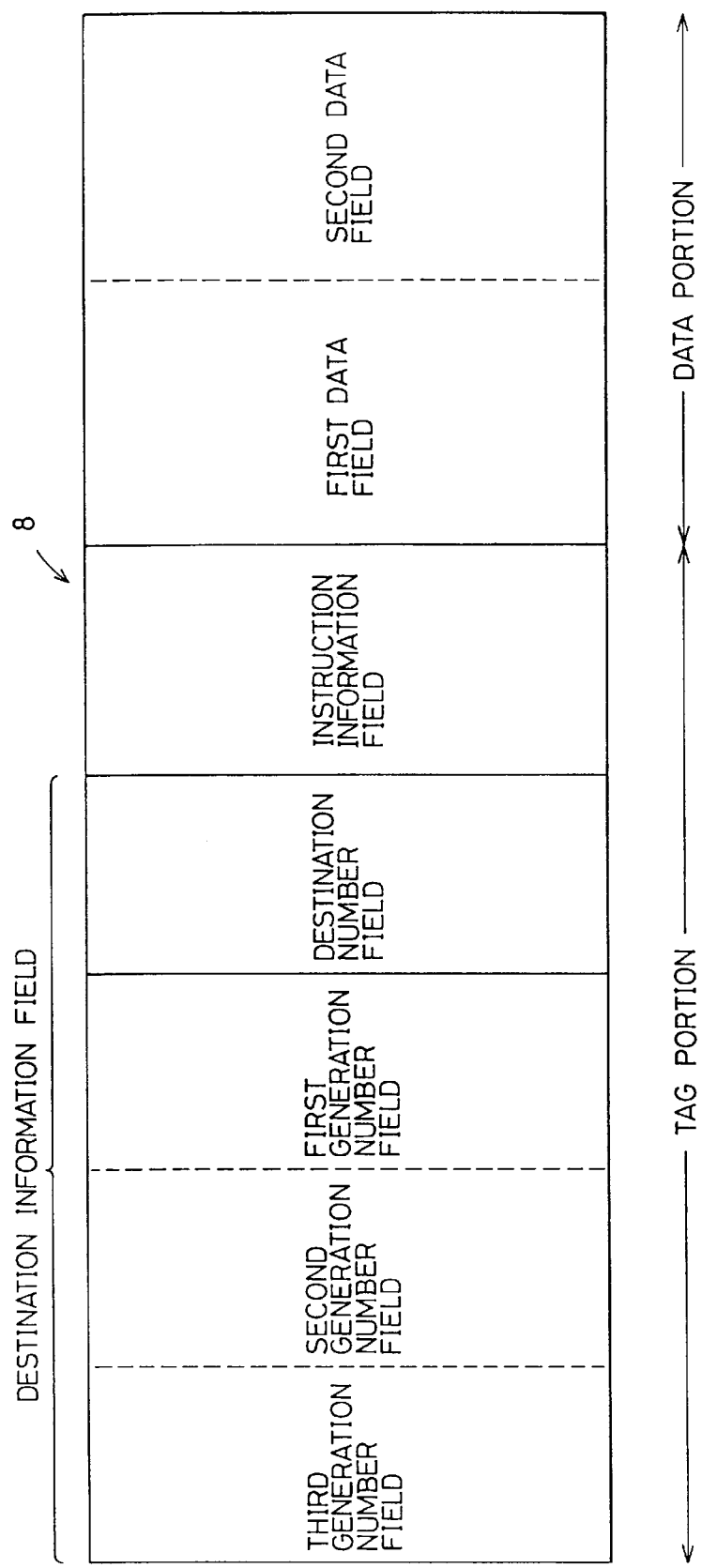
FIG. 7 schematically shows a field configuration of an input data packet.

Input data packet forming unit 11 is for forming a data packet automatically in response to input of data. FIG. 7 shows a configuration of a data packet.

Referring to FIG. 7, a data packet 8 includes a field storing a generation number, a destination number field storing a destination number, an instruction information field storing instruction information designating the processing to be carried out in operation processing unit 4, and first and second data fields respectively storing data to be subjected to processing.

The generation number field is divided into first to third partial generation number fields. Therefore, the generation number is managed three-dimensionally by three values stored in these three fields. The destination number field and the first to third partial generation number fields form a destination information field.

Input data packet forming unit 11 stores externally applied data in the first data field of data packet 8. Input data packet forming unit 11 forms a three-dimensional generation number according to the procedure to be described later, and stores numbers in respective dimensions in the first to third partial generation number fields of data packet 8. Input data packet forming unit 11 forms destination numbers according to the input order, for example, and stores the destination numbers in the destination number field of data packet 8. Therefore, values are respectively stored in the first to third partial generation number fields, the destination number field, and the first data field (input data) of data packet 8 immediately after output from input data packet forming unit 11.

Input/output control unit 1 has an input control function and an output control function. The input control function temporarily stores a data packet applied from input data packet forming unit 11, and sends data sequentially to a pipeline formed of program storing unit 2, data pair generating unit 3, and operation processing unit 4. The output control function determines destination of data in response to destination information added to a data packet processed via the pipeline and output from operation processing unit 4.

Figure 8:
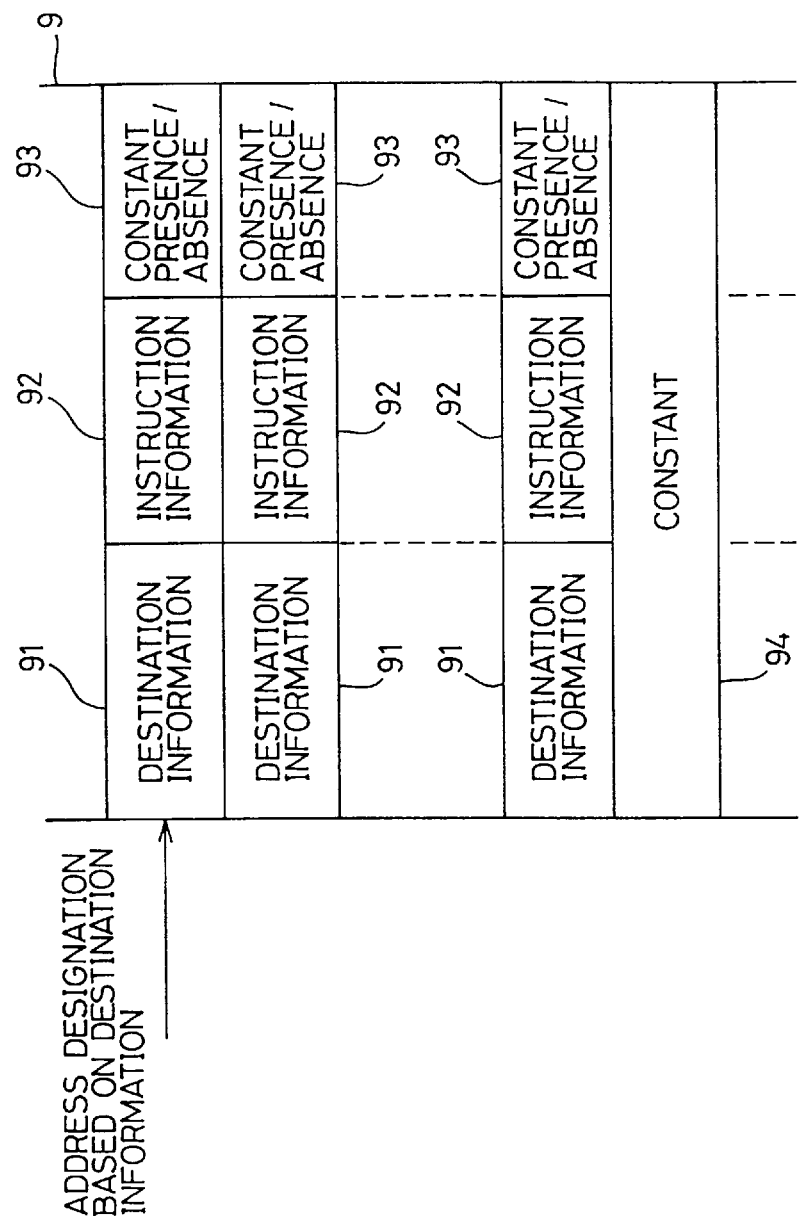
FIG. 8 schematically shows a configuration of a data flow program stored in a program storing unit.

Program storing unit 2 prestores a data flow program 9 shown in FIG. 8. Each line of data flow program 9 includes destination information 91, instruction information 92, and constant presence/absence information 93. Constant data 94 is stored in a line next to a line in which the constant presence/absence information indicates "presence". According to address designation based on destination information of an input data packet, program storing unit 2 reads out destination information 91, instruction information 92, and constant presence/absence information 93 of data flow program 9, stores destination information 91 and instruction information 92 in a destination field and an instruction field of the data packet, respectively, and outputs the data packet.

Data pair generating unit 3 carries out matching of the data packets provided from program storing unit 2. More specifically, when instruction information 92 of the applied data packet indicates processing requiring two inputs, data pair generating unit 3 checks whether another data packet having the same instruction information 92 and destination information 91 being already stored in data pair generating unit 3. If such a data packet is stored in data pair generating unit 3, the data packet is read out. Operand data (the contents of the first field data in FIG. 7) included in one data packet of the two data packets is stored in the second data field of the other data packet, and the second data packet including the two operand data is provided. If such a data packet is not stored in data pair generating unit 3, data pair generating unit 3 stores the data packet for later matching. When instruction information 92 in the applied data packet indicates processing requiring only one input, data pair generating unit 3 directly outputs the data packet.

Operation processing unit 4 carries out an operation instruction to data stored in data fields in the data packet output from data pair generating unit 3 according to instruction information 92 included in the data packet. Operation processing unit 4 stores the result in the first data field of the data packet, and sends the data packet to input/output control unit 1.

Input/output control unit 1 determines the output destination of the data packet, and again applies the data packet to the pipeline according to the result, or outputs the data packet.

As described above, a data packet continues to circulate program storing unit 2, data pair generating unit 3, operation processing unit 4, and input/output control unit 1 in order, and is subjected to operation processing based on data flow program 9 stored in program storing unit 2.

Figure 9:
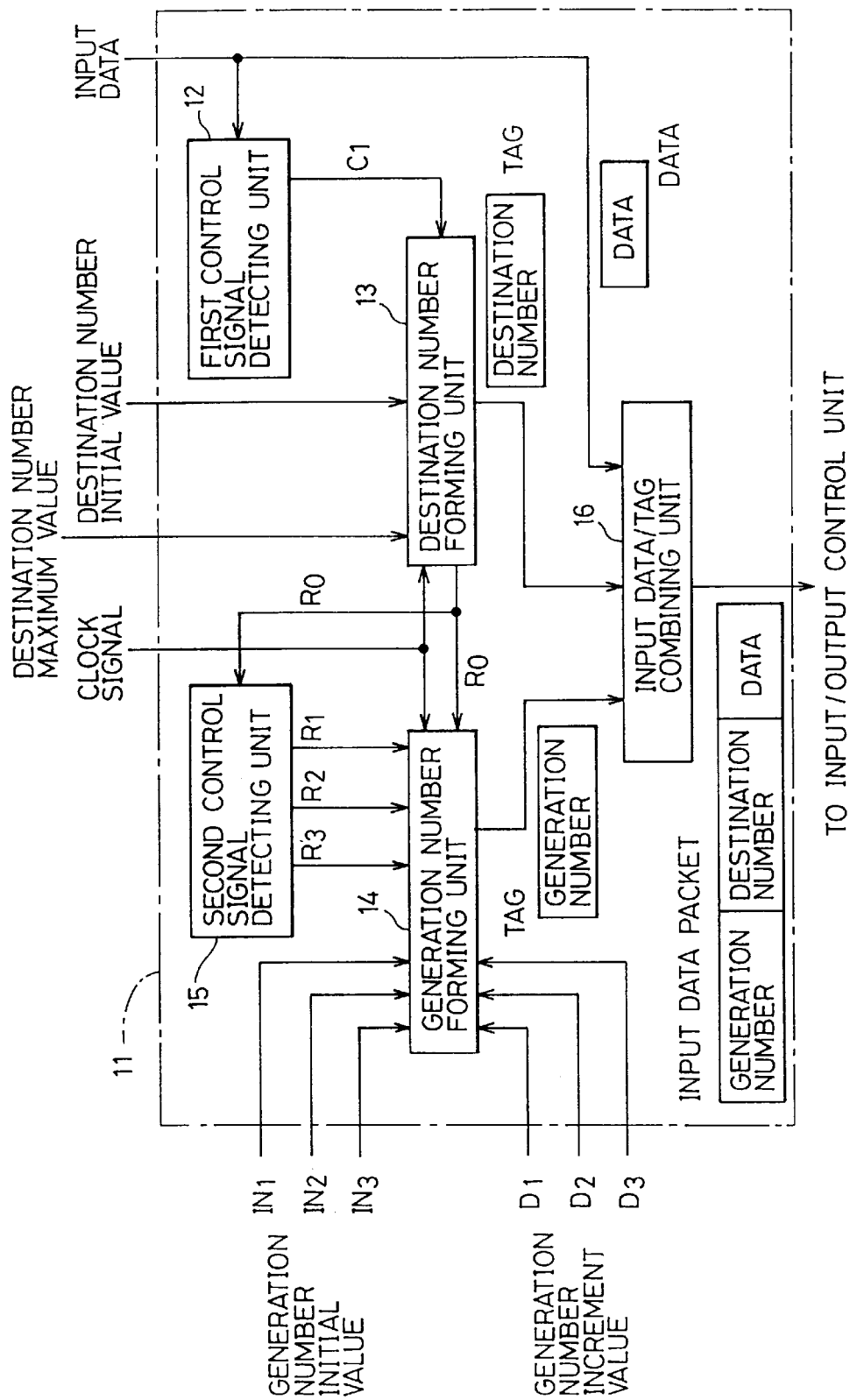
FIG. 9 is a block diagram showing a configuration of an input data packet forming unit.

Referring to FIG. 9, input data packet forming unit 11 includes a first control signal detecting unit 12 generating a control signal C1 in response to input data, a destination number forming unit 13 sequentially forming destination numbers in response to the control signal C1 and generating a control signal R0 for updating a generation number, a second control signal detecting unit 15 generating control signals R1, R2 and R3 to be input to a generation number forming unit 14 based on the control signal R0, generation number forming unit 14 sequentially forming generation numbers in response to the control signals R0 to R3, and an input data/tag combining unit 16.

Destination number forming unit 13 is one example of destination number generating means. Generation number forming unit 14 is one example of generation number generating means. Input data/tag combining unit 16 is one example of data combining means.

Input data/tag combining unit 16 combines a tag portion including a generation number provided from generation number forming unit 14 and destination number formed by destination number forming unit 13 and a data portion including input data to form an input data packet shown in FIG. 7. The formed input data packet is applied to input/output control unit 1 (cf. FIG. 6), and the data is processed by the above-described pipeline processing.

Generation number forming unit 14 forms a three-dimensional generation number. Generation numbers in respective dimensions are stored in the first to the third partial generation number fields in data packet 8 shown in FIG. 7.

Figure 10:
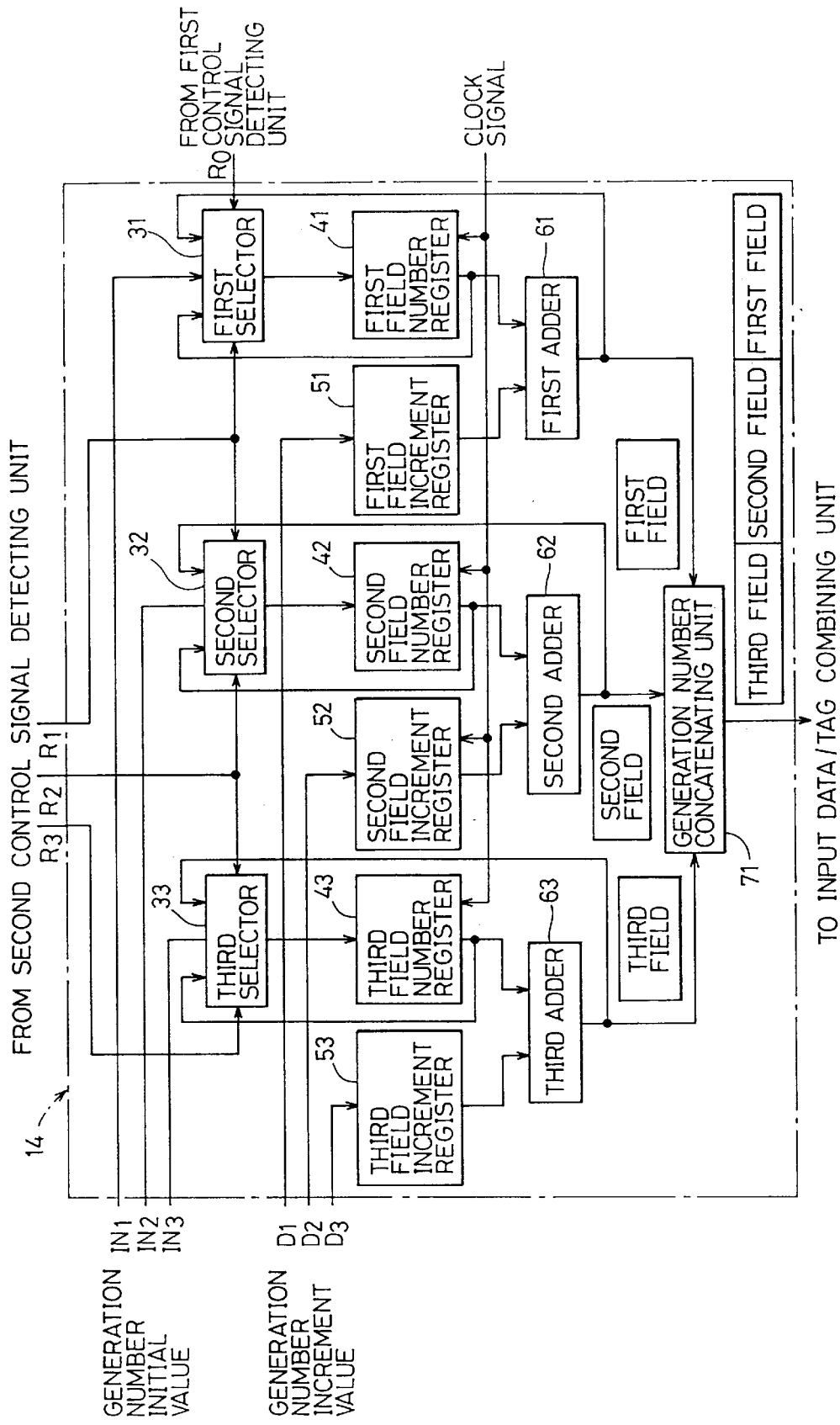
FIG. 10 is a block diagram showing a configuration of a generation number forming unit.

Referring to FIG. 10, generation number forming unit 14 includes first to third 3-input selectors 31–33 for selectively providing input signals in response to the control signals R0 to R3, respectively, first to third field number registers 41 to 43 for storing generation numbers stored in the first to third fields, first to third field increment registers 51 to 53 for storing increment values of the generation numbers of the first to third fields, first to third adders 61 to 63 for respectively adding values stored in first to third field number registers 41 to 43 and values stored in first to third field increment registers 51 to 53, and a generation number concatenating unit 71 for concatenating numbers provided from first to third adders 61 to 63.

Generation number forming unit 14 receives a clock signal from an external clock generating unit (not shown), the control signal R0 from destination number forming unit 13, the control signals R1 to R3 from second control signal detecting unit 15, generation number initial values from the outside of data driven information processor 100, and a generation number increment value also from the outside of data driven information processor 100.

Generation number initial values IN1 to IN3 corresponding to first to third fields of a generation number are externally applied to generation number forming unit 14. Three generation number increment values D1 to D3 corresponding to first to third fields of the generation number are externally applied to generation number forming unit 14.

The clock signal is applied to first to third field number registers 41 to 43. The control signal R0 is applied to first selector 31. The control signal R1 is applied to first and second selectors 31 and 32. The control signal R2 is applied to second and third selectors 32 and 33. The control signal R3 is applied to third selector 33.

The first to third generation number initial values IN1 to IN3 are respectively applied to first to third selectors 31 to 33. The first to third generation number increment values D1 to D3 are respectively applied to first to third field increment registers 51 to 53.

It should be noted that the first to third generation number initial values IN1 to IN3 and the first to third generation number increment values D1 to D3 may be set by using a DIP switch (not shown) which can be manipulated from the outside of data driven information processor 100, or a register (not shown) provided inside or outside generation number forming unit 14, for example.

Generation number forming unit 14 operates as follows. For the purpose of simplicity, assume that "n" represents an arbitrary value of 1 to 3 in the following description. More specifically, the control signals R0 to R3, the generation number initial values IN1 to IN3, the generation number increment values D1 to D3, first to third selectors 31 to 33, first to third field number registers 41 to 43, first to third field increment registers 51 to 53, and first to third adders 61 to 63 are represented by "Rn", Dn", "the n-th selector", the "n-th field number register", "the n-th field increment register" and "the n-th adder", respectively.

The n-th selector, controlled by control signals R (n−1), Rn, selects any one of an input signal from the n-th adder, generation number initial value INn, and an input signal from the n-th field number register, and sends the selected signal to the n-th field number register. The condition of selective output by the n-th selector is shown in FIG. 11.

Figures 11, 12:
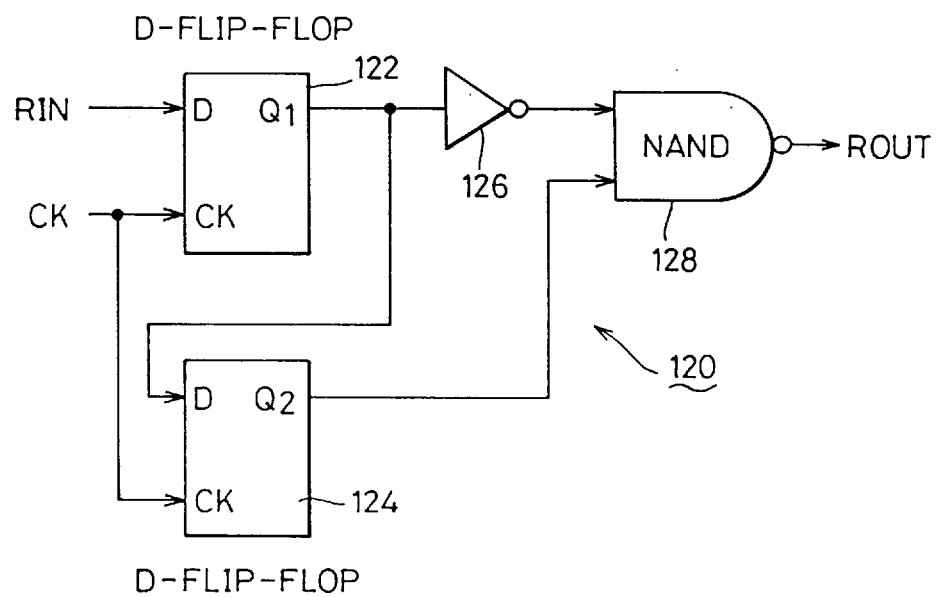
FIG. 11 schematically shows a relationship between an input signal and a select output signal in a selector of the generation number forming unit.
FIG. 12 is a block diagram showing a configuration of a signal processing circuit.

Referring to FIG. 11, the n-th selector is set so that it selects the input signal from the n-th adder when it receives only the control signal R (n−1), selects the generation number initial value INn when it receives only the control signal Rn, selects the generation number initial value INn when it receives both the control signals R (n−1) and Rn, and selects the input signal from the n-th field number register when it receives neither the control signals R (n−1) nor Rn. Although not shown in the drawings, each selector may be set so that it selectively provides the value of the generation number initial value INn in response to a master reset signal provided, for example, at the time of power-on of data driven information processor 100.

Referring again to FIG. 10, the n-th field number register holds an input signal from the n-th selector in response to the clock signal, and applies the signal to the n-th adder and the n-th selector. The n-th adder adds the value of the n-th field increment register and the value of the n-th field number register to form the n-th field number, and sends the value (output signal) to generation number concatenating unit 71 and the n-th selector.

Generation number concatenating unit 71 concatenates first to third field numbers respectively formed by first to third adders 61 to 63 to form a three-dimensional generation number and applies the same to input data/tag combining unit 16 (cf. FIG. 9).

The procedure of forming a generation number will now be described specifically.

Assume that all the generation number initial values IN1 to IN3 are set to "0", and that all the generation number increment values D1 to D3 are set to "1". Assume that one control signal R1 is applied to generation number forming unit 14 for every four control signals R0, one control signal R2 is applied to generation number forming unit 14 for every eight control signals R0, and that one control signal R3 is applied to generation number forming unit 14 for every 16 control signals R0. At this time, the three-dimensional generation number takes the values as shown in Table 1.

TABLE 1

| Control Signal | Generation Number | | | State |
|---|---|---|---|---|
| | Third field number | Second field number | First field number | |
| R3, R2, R1, R0 | 1 | 1 | 1 | ← initial state |
| R0 | 1 | 1 | 2 | |
| R0 | 1 | 1 | 3 | |
| R0 | 1 | 1 | 4 | |
| R1, R0 | 1 | 2 | 1 | ← The second field is increased in response to R1. |
| R0 | 1 | 2 | 2 | |
| R0 | 1 | 2 | 3 | |
| R0 | 1 | 2 | 4 | |
| R2, R1, R0 | 2 | 1 | 1 | ← The third field is increased in response to R2. |
| R0 | 2 | 1 | 2 | |
| R0 | 2 | 1 | 3 | |
| R0 | 2 | 1 | 4 | |
| R1, R0 | 2 | 2 | 1 | ← The second field is increased in response to R1. |
| R0 | 2 | 2 | 2 | |
| R0 | 2 | 2 | 3 | |
| R0 | 2 | 2 | 4 | |
| R3, R2, R1, R0 | 1 | 1 | 1 | ← Return to the initial state in response to R1 to R3. |
| R0 | 1 | 1 | 2 | |

As described above, data driven information processor 100 of this embodiment adds destination information of a destination number and a generation number to input data to form an input data packet, and sends the input data packet to a pipeline processing system of program storing unit 5, data pair generating unit 7, and operation processing unit 9, through input/output control unit 3. Therefore, data driven information processor 100 of this embodiment unnecessitates intricate manipulation of the user to input destination information together with input data, and allows simple manipulation of data driven information processor 100.

Generation number forming unit 14 generates a three-dimensional generation number, and includes the generated three-dimensional generation number in a data packet as destination information in input data/tag combining unit 16. Therefore, it is possible to carry out pipeline processing effectively also in the case of image processing data, for example, for which processing of three-dimensional data is appropriate.

In this embodiment, generation number concatenating unit 71 of generation number forming unit 14 concatenates generation numbers of respective dimensions provided from first to third adders 61 to 63 to form a three-dimensional generation number, as shown in FIG. 10. However, the present invention is not limited thereto. Generation number concatenating unit 71 may generate a three-dimensional generation number upon receipt of outputs from first to third field number registers 41 to 43 instead of outputs from first to third adders 61 to 63. Note that the values of respective fields of a generated generation number become smaller than those of the configuration shown in FIG. 10 by values designated by the generation number increment values D1 to D3, respectively.

In this embodiment, the data driven information processor generates a three-dimensional generation number. However, the present invention is not limited thereto, but can be applied similarly to a data driven information processor which generates a two-dimensional or four or more dimensional generation number.

FIG. 12 is a block diagram showing a configuration of a signal processing circuit 120 used in the above-described first control signal detecting unit 12 and second control signal detecting unit 15. Referring to FIG. 12, signal processing circuit 120 includes a D type flip-flops 122, 124, an NOT circuit 126, and an NAND circuit 128.

Signal processing circuit 120 receives the input signal RIN and the clock signal CK. The input signal RIN is applied to a D terminal of D type flip-flop 122. The clock signal CK is applied to respective CK terminals of D type flip-flops 122 and 124. The signal provided from Q1 terminal of D type flip-flop 122 is applied to one input terminal of NAND circuit 128 via NOT circuit 126. This signal is also applied to a D terminal of D type flip-flop 124.

The signal provided from a Q2 terminal of D type flip-flop 124 is applied to the other input terminal of NAND circuit 128. NAND circuit 128 outputs the output signal ROUT. The output signal ROUT is an output of signal processing circuit 120.

The function of signal processing circuit 120 as configured above is shown by the expression (2). It should be noted that signal processing circuit 120 is for detecting switching of the input signal RIN from the "H" level to the "L" level.

$$ROUT_{n+1} = \overline{RIN_n} \cdot \overline{\overline{RIN}_{n+1}} \tag{2}$$

Figure 13:
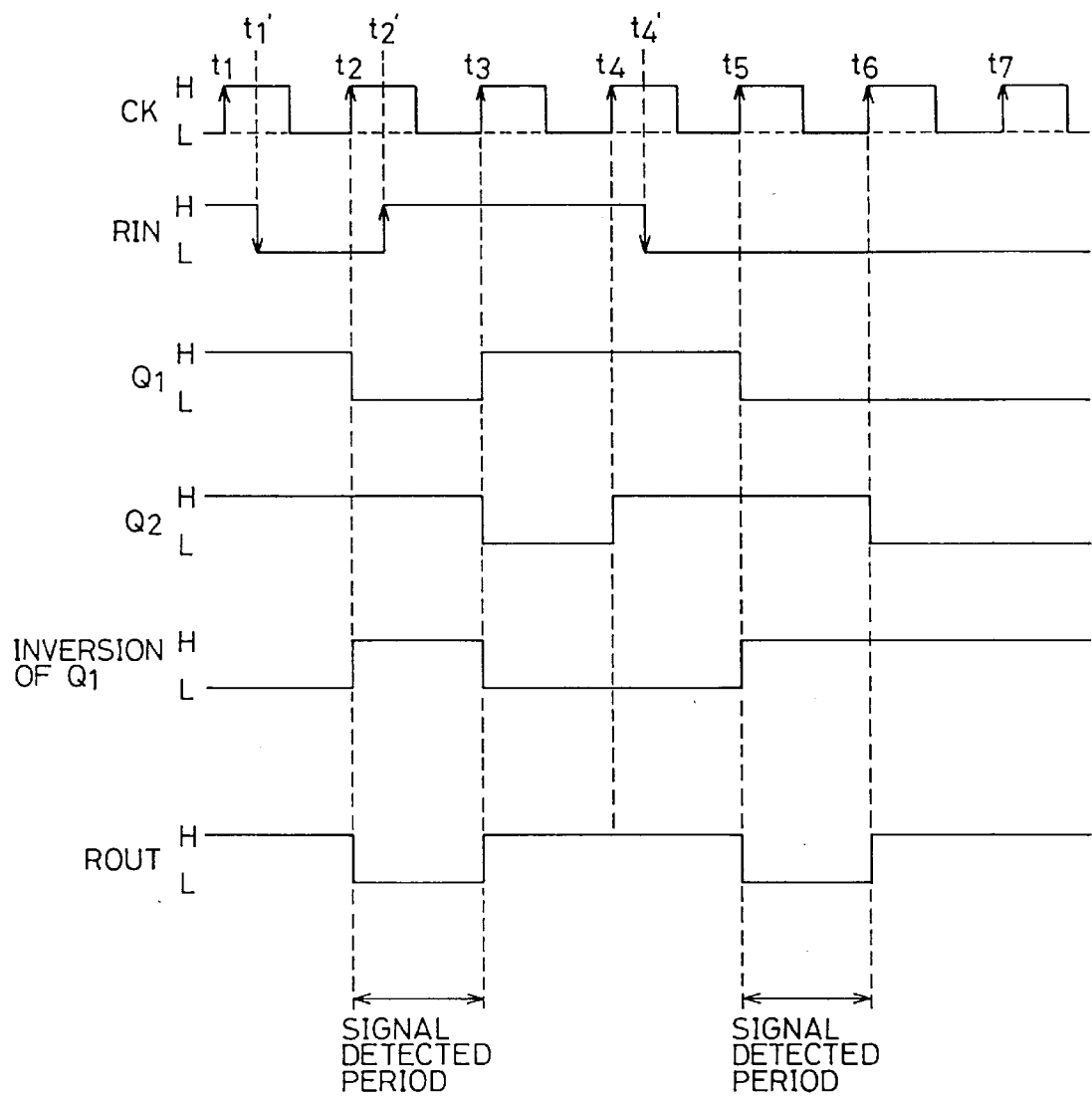
FIG. 13 is a waveform diagram showing change of respective signals in the signal processing circuit.

FIG. 13 is a waveform diagram showing change of signals in signal processing circuit 120.

Referring to FIG. 13, assume that the input signal RIN changes from an "H" level to an "L" level at time t1', and that the input signal RIN changes from the "L" level to the "H" level at time t2'. When the input signal RIN again changes from the "H" level to the "L" level at time t4', the output signal Q1 falls from the "H" level to the "L" level in response to a rising of the clock signal CK at time t2. When the input signal RIN changes from the "L" level to the "H" level at time t2', the output signal Q1 rises from the "L" level to the "H" level in response to a rising of the clock signal CK at time t3.

When the signal Q1 changes from the "H" level to the "L" level at time t2, an output signal Q2 of D type flip-flop 124 (FIG. 12) falls from the "H" level to the "L" level in response to a rising of the clock signal at time t3. Since the signal Q1 changes from the "L" level to the "H" level at time t3, the signal Q2 further changes to the "H" level from the "L" level in response to a rising of the clock signal CK at time t4.

When the input signal RIN changes from the "H" level to the "L" level at time t4', the signal Q1 changes from the "H" level to the "L" level at time t5. The signal Q2 changes from the "H" level to the "L" level at time t6.

The output of NOT circuit 126 is an inversion of the signal Q1. The output of NOT circuit 126 attains the "L" level during a time period t1–t2, the "H" level during a time period t2–t3, the "L" level during a time period t3–t5, and the "H" level at time t5 and later.

The output signal ROUT is an NAND of the signal Q2 and the inversion of the signal Q1. The output signal ROUT attains the "L" level during time periods t2–t3 and t5–t6. These two time periods both correspond to one cycle of the clock signal CK, and respectively indicate change of the input signal RIN to the "L" level one time.

As described above, in this embodiment, as shown by the time period t1'–t2' of FIG. 13, the period during which the detected signal ROUT is maintained at the "L" level can be equalized with one cycle of the clock signal CK, when the input signal RIN is again brought to the "H" level after the "L" level for a certain time period. In addition, the period during which the detected signal ROUT is maintained at the "L" level can be equalized with one cycle of the clock signal CK also when the input signal RIN is maintained at the "L" level as shown at time t4' and later. With signal processing circuit 120, it is possible to obtain a detected signal which lasts for a time period equal to one cycle of the clock signal CK without raising the input signal RIN again to the "H" level. Therefore, according to the present invention, mechanism for generating the input signal RIN can be simplified. Even if one cycle of the clock signal CK is short, the period of the "L" level of the input signal RIN can be made longer than one cycle of the clock signal CK. Therefore, since switching of the input signal RIN into the "L" level can be detected easily, occurrence of a signal detecting error or the like can be prevented as much as possible.

Signal processing circuit 120 can be applied to input data packet forming unit 11 shown in FIG. 9, for example. More specifically, signal processing circuit 120 can be incorporated in first control signal detecting unit 12, second control signal detecting unit 15, designation number forming unit 13 and generation number forming unit 14 and used for detection of the control signal CK and the control signals R0 to R3. It is possible to appropriately detect various control signals in input data packet forming unit 11, and occurrence of fault caused by a signal detecting error in data driven information processor 100 can be prevented to the utmost.

In this embodiment, the present invention is applied to a circuit for detecting an active low control signal. However, the present invention is not limited thereto, but can be applied to a circuit in which the polarity of the signal is opposite. More specifically, the present invention can be applied similarly to a circuit for holding a logical expression as shown in the expression (3).

$$ROUT_{n+1} = \overline{RIN_n} \cdot RIN_{n+1} \quad (3)$$

As described above, according to one aspect of the present invention, the generation number generating means in the data packet forming means generates a multidimensional generation number, and includes the same in destination information of a data packet. It is possible to manage data to be subjected to processing in a data driven information processor multidimensionally.

According to another aspect of the present invention, a part of switching operation of the input signal can be simplified.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A data driven information processor comprising:

a data packet generator for generating data packets; and a data flow ring architecture for operating, according to data flow computational protocol, upon data packets received from the data packet generator;

wherein said data packet generator is operable to configure each data packet to include a multi-attribute tag,
said multi-attribute tag having a first component and a second component,
said first component identifying the data of the data packet as belonging to one of a plurality of data sets, and said second component uniquely identifying the data within a data set identified by said first component.

2. The data driven information processor as in claim 1, wherein:

each of said plurality of data sets is a matrix of rows and columns;

said second component of a data packet has a first part and a second part;

said first part of said second component identifying the row in which the data of the data packet is located within said data set identified by said first component; and said second part of said second component identifying the column in which the data of the data packet is located within said data set identified by said first component.

3. The data driven information processor as in claim 2, wherein each data set represents an image and each datum represents a pixel within said image.

4. The data driven information processor as in claim 1, wherein said second component identifies a relative priority of the data within the data set.

5. The data driven information processor as in claim 4, wherein said relative priority of the data within the data set is determined according to a relative importance of the data within the set.

6. The data driven information processor as in claim 4, wherein said relative priority of the data within the data set is determined according to a relative age of the data within the set.

7. The data driven information processor as in claim 4, wherein said relative priority of the data within the data set is determined according to a relative position of the data within the set.

8. A method of configuring data packets for a data driven information processor, the data driven information processor having a data packet generator for generating said data packets, and a data flow ring architecture for operating, according to data flow computational protocol, upon data packets received from said data packet generator, the method comprising the steps of:

configuring data packets; and operating, according to data flow computational protocol, upon said data packets produced by said step of configuring;

wherein said step of configuring includes the step of:
including a multi-attribute tag in each data packet, said multi-attribute tag having a first component and a second component, wherein said step of including a multi-attribute tag includes the steps of:
defining said first component to identify the data of the data packet as belonging to one of a plurality of data sets;
defining said second component to uniquely identify the data within a data set identified by said first component.

9. The method in claim 8, wherein:

each of said plurality of data sets is a matrix of rows and columns;

said step of including a multi-attribute tag includes the steps of:

defining said second component to have a first part and a second part;

defining said first part of said second component to identify the row in which the data of the data packet is located within said data set identified by said first component; and defining said second part of said second component to identify the column in which the data of the data packet is located within said data set identified by said second component.

10. The method as in claim 9, wherein each data set represents an image and each datum represents a pixel within said image.

11. The method as in claim 8, wherein said step of defining said second component to uniquely identify includes the step of defining said second component to identify a relative priority of the data within the data set.

12. The method as in claim 11, wherein said relative priority of the data within the data set is determined according to a relative importance of the data within the set.

13. The method as in claim 11, wherein said relative priority of the data within the data set is determined according to a relative age of the data within the set.

14. The method as in claim 11, wherein said relative priority of the data within the data set is determined according to a relative position of the data within the set.

* * * * *